(12) United States Patent
Joseph et al.

(10) Patent No.: US 8,088,861 B2
(45) Date of Patent: Jan. 3, 2012

(54) TIRE INNER GUM

(75) Inventors: Aurélie Joseph, Chamalieres (FR); Aline Riou, Cebazat (FR); Julien Berriot, Les Martres de Veyre (FR); Julien Cladiere, Clermont-Ferrand (FR)

(73) Assignees: Societe de Technologie Michelin, Clemont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 12/601,813

(22) PCT Filed: May 23, 2008

(86) PCT No.: PCT/EP2008/004138
§ 371 (c)(1),
(2), (4) Date: May 20, 2010

(87) PCT Pub. No.: WO2008/145314
PCT Pub. Date: Dec. 4, 2008

(65) Prior Publication Data
US 2010/0227968 A1    Sep. 9, 2010

(30) Foreign Application Priority Data
May 25, 2007 (FR) ..................................... 07 03751

(51) Int. Cl.
*B60C 1/00* (2006.01)
*C08K 3/04* (2006.01)

(52) U.S. Cl. ........ 524/526; 524/525; 152/510; 152/524; 152/525

(58) Field of Classification Search ................... 524/526, 524/525; 152/510, 524, 525
See application file for complete search history.

(56) References Cited

U.S. PATENT DOCUMENTS

| | | | | |
|---|---|---|---|---|
| 6,062,283 A | * | 5/2000 | Watanabe et al. | 152/510 |
| 2004/0226643 A1 | * | 11/2004 | Yagi et al. | 152/510 |

FOREIGN PATENT DOCUMENTS

| | | |
|---|---|---|
| CN | 1 861 669 | 11/2006 |
| JP | 2004 143366 | 5/2004 |
| JP | 2005-263856 | 9/2005 |
| KR | 746 335 B1 * | 8/2007 |
| WO | WO 2006/047509 | 5/2006 |

* cited by examiner

*Primary Examiner* — Robert D. Harlan
(74) *Attorney, Agent, or Firm* — Cozen O'Connor

(57) ABSTRACT

A tire inner liner having a rubber composition based on at least one butyl rubber, a reinforcing filler, graphite and a plasticizing system. The plasticizing system comprises a hydrocarbon plasticizing resin, the glass transition temperature $T_g$ of which is above 20° C. and the softening point of which is below 170° C. A process for producing such a composition for a tire inner liner comprises incorporating into a diene elastomer, in a mixer: a reinforcing filler, graphite, and a plasticizing system, by thermomechanically mixing all the ingredients, one or more times, until a maximum temperature between 110° C. and 190° C. is reached; cooling the mixture down to a temperature below 100° C.; then incorporating a crosslinking system; and mixing everything until a maximum temperature below 110° C. is reached.

36 Claims, No Drawings

TIRE INNER GUM

RELATED APPLICATIONS

This is a U.S. national stage under 35 USC §371 of application No. PCT/EP2008/004138, filed on May 23, 2008.

This application claims the priority of French application Ser. No. 07/03751 filed May 25, 2007, the entire content of which is hereby incorporated by reference.

FIELD OF THE INVENTION

The present invention relates to a rubber composition for the manufacture of an air-impermeable tire internal layer, commonly called a tire "inner liner".

BACKGROUND OF THE INVENTION

Tubeless tires have in fact an inner surface of low air permeability so as to prevent the tire from deflating and to protect the sensitive internal regions of said tire from the ingress of oxygen and water, such as the plies containing oxidation-sensitive metal cords, this protection improving the endurance of the tire. At the present time, such protection of the inner surface of tires is achieved by inner liners consisting of elastomeric compositions based on butyl rubber.

However, since fuel savings and the need to protect the environment have become priorities, it is desirable to produce air-impermeable inner liners with the lowest possible weight and smallest possible hysteresis so as to improve the rolling resistance of the tire. The air impermeability performance of butyl rubbers is dependent on having a not insignificant minimum thickness (of the order of one millimeter) and therefore a certain weight, which means that these new requirements are not effectively met.

Thus, it is necessary to add reinforcing fillers, such as carbon black, to the elastomeric composition of the inner liner in order to improve its impermeability. However, in large quantities these reinforcing fillers impair certain properties of the composition both in the green state—difficulty in processing the green composition, i.e. processability difficulty—and in the cured state—degradation in mechanical properties, especially a reduction in flexural strength. By introducing plasticizers of the oil type it is possible to alleviate these processing and mechanical property aspects, but very greatly to the detriment of impermeability.

Various solutions have been envisaged for remedying these drawbacks, in particular by the use of other types of fillers, often known as smectites and in particular as organophilic smectites, to be added to the reinforcing fillers. These organophilic smectites improve the impermeability properties of a material if they are well dispersed in the material, i.e. if these fillers are both uniformly distributed within the material and very compatible with the latter. This dispersion is often difficult to achieve owing to the poor thermodynamic compatibility that exists between the elastomers and such fillers.

The publication WO 2006/047509 by the Applicant describes a tire inner liner composition based on butyl rubber and containing carbon black, includes non-reinforcing fillers consisting of organophilic smectites that reduce the gas permeability, said fillers being dispersed in the elastomeric matrix, and also a specific plasticizer consisting of a terpene resin having in particular a glass transition temperature $T_g$ above 50° C. This composition does actually have mechanical and impermeability properties that make it acceptable for use as a tire inner liner thanks to the combined effect of these organophilic smectites and this high-$T_g$ resin.

The Applicant has continued its research and has surprisingly discovered a rubber composition for a tire inner liner based on at least one butyl rubber, a reinforcing filler, graphite and a hydrocarbon plasticizing resin, which composition has processability and flexural strength properties as good as the compositions of the prior art, and improved gas impermeability properties, and which also makes it possible for the rolling resistance and endurance properties to be significantly improved without, of course, this being to the detriment of other properties.

In addition, the Applicant has found, surprisingly, that hydrocarbon plasticizing resins having a $T_g$ above 20° C., and preferably above 30° C., make it possible to obtain, in combination with graphite, properties as good as for the more restrictive combination of resins having a $T_g$ above 50° C. with organophilic smectites.

SUMMARY OF THE INVENTION

Thus, one object of the invention is to provide a novel tire inner liner composition having even better impermeability properties than the aforementioned solutions as well as an improved rolling resistance, without the processability and flexural strength mechanical properties being degraded.

This and other objects are attained in accordance with one aspect of the invention directed to a tire inner liner having a rubber composition based on at least one butyl rubber, a reinforcing filler and a plasticizing system, characterized in that the composition also includes graphite and in that the plasticizing system comprises a hydrocarbon plasticizing resin, the glass transition temperature $T_g$ of which is above 20° C. and the softening point of which is below 170° C.

Advantageously, the elastomeric matrix of the rubber composition comprises predominantly one butyl rubber or predominantly one blend of several butyl rubbers, or else only one butyl rubber or one blend of several butyl rubbers.

Preferably, the reinforcing filler comprises carbon black, more particularly with a content of greater than 30 phe (per hundred parts of elastomer).

According to one feature of the invention, the content of hydrocarbon plasticizing resin is between 2 and 35 phe, and preferably between 5 and 25 phe.

According to another feature of the invention, the graphite may be in the form of natural or synthetic graphite, whether expanded or not, or in the form of a blend of natural graphites and/or expanded graphites and/or synthetic graphites. Preferably, the graphite is present with a content between 3 and 50 phe and more preferably still between 5 and 30 phe.

Another aspect of the invention relates to a tire that includes an inner liner having a rubber composition based on at least one butyl rubber, a reinforcing filler and a plasticizing system, characterized in that the composition also includes graphite and in that the plasticizing system comprises a hydrocarbon plasticizing resin, the glass transition temperature $T_g$ of which is above 20° C. and the softening temperature of which is below 170° C.

Another aspect of the invention relates to a process for producing a composition for a tire inner liner based on at least one butyl rubber, a reinforcing filler and a plasticizing system, characterized in that the composition also includes graphite and in that the plasticizing system comprises a hydrocarbon plasticizing resin, the glass transition temperature $T_g$ of which is above 20° C., said process comprising the following steps:

of incorporating into a diene elastomer, in a mixer:
a reinforcing filler,
graphite and
a plasticizing system, by thermomechanically mixing all the ingredients, one or more times, until a maximum temperature between 110° C. and 190° C. is reached;
of cooling the mixture down to a temperature below 100° C.;
of then incorporating a crosslinking system; and
of mixing everything until a maximum temperature below 110° C. is reached.

I.—MEASUREMENTS AND TESTS

The rubber compositions are characterized, before and after curing, as indicated below.

I-1. Mooney Plasticity

An oscillating consistometer as described in the French standard NF T 43-005 (1991) is used. The Mooney plasticity measurement is carried out according to the following principle: the composition in the green state (i.e. before curing) is moulded in a cylindrical enclosure heated to 100° C. After preheating for one minute, the rotor rotates within the specimen at two revolutions/minute and the useful torque for sustaining this movement is measured after four minutes of rotation. The Mooney plasticity (ML 1+4) is expressed in "Mooney units" (one MU=0.83 newton.meter).

I-2. Rheometry

The measurements are carried out at 150° C. with an oscillating-chamber rheometer according to the standard DIN 53529—Part 3 (June 1983). The variation in rheometric torque as a function of time describes the variation in stiffening of the composition as a result of the vulcanization reaction. The measurements are processed according to the standard DIN 53529—Part 2 (March 1983). $T_i$ is the induction time, i.e. the time needed before the onset of the vulcanization reaction. The first-order rate of conversion constant denoted by K (expressed in $min^{-1}$), calculated between 30% and 80% conversion, is also measured. This allows the vulcanization rate to be determined.

I-3. Tensile Tests

These tests are used to determine the elastic stresses and the properties at break. Unless otherwise indicated, they are carried out in accordance with the French standard NF T 46-002 of September 1988. What are called the "nominal" secant moduli (or apparent stresses, in MPa) are measured in second elongation (i.e. after an accommodation cycle) at 10% elongation (denoted "MA10") and 100% elongation ("MA100"). All these tensile measurements are carried out under standard temperature (23±2° C.) and relative humidity (50±5% RH) conditions according to the French standard NF T 40-101 (December 1979). The stresses at break (in MPa) and the elongations at break (in %) are also measured at a temperature of 23° C.

I-4. Permeability

The permeability is measured using a MOCON OXTRAN 2/60 permeability "tester" at 40° C. Cured specimens in the form of disks with a defined thickness (approximately 0.8 to 1 mm) are mounted on the apparatus and sealed with vacuum grease. One of the faces of the disk is maintained under 10 psi of nitrogen while the other face is maintained under 10 psi of oxygen. The increase in oxygen concentration is monitored using a "Coulox" oxygen detector on the face maintained under nitrogen. The oxygen concentration on the face maintained under nitrogen for achieving a constant value, used to determine the oxygen permeability, is recorded.

An arbitrary value of 100 is given for the oxygen permeability of the control, a result of less than 100 indicating a reduction in oxygen permeability and therefore better impermeability.

I-5. Tests on Tires

A) Rolling Resistance

The rolling resistance is measured on a rotating drum in accordance with the method ISO 87-67 (1992). A value above that of the control, arbitrarily set at 100, indicates a better result, i.e. a lower rolling resistance.

B) Endurance

The endurance is measured here by two tests, namely a load/speed test and a low-pressure test:

The load/speed test corresponds to making an inflated tire rotate on a rotating drum with a load applied, followed by a rise in speed in steps with the speed held for a defined time at each step up to the maximum speed designed for this type of tire. This test and the conditions under which it is carried out are described in detail in the Jul. 14, 1999 Addendum 29 (Regulation 30), Revision 2 of the 1958 Geneva UNECE (United Nations Economic Commission for Europe) Agreement entitled "Agreement on adopting uniform technical requirements applicable for wheel vehicles, equipment and parts that may be mounted or used on a wheeled vehicle and the conditions of reciprocal recognition of approvals issued under these requirements".

The low-pressure test checks that, after the inflated tires have traveled for a given time at a given temperature and at a given speed, they have undergone no visible delamination, rupture or tearing damage of the tread or carcass and that the inflation pressure measured at least one hour after the end of the test is not below the initial pressure. This test is carried out in accordance with the United States FMVSS (Federal Motor Vehicle Safety Standard) regulation 571.139 (published on Oct. 1, 2004) which applies to "New tires for equipping motor vehicles other than motorcycles and low-speed vehicles with a total loaded weight of 10 000 lbs or less and manufactured after 1975".

II. DETAILED DESCRIPTION OF EMBODIMENTS OF THE INVENTION

The rubber composition according to the invention, which can be used for manufacturing the inner liner of a tire, comprises at least a butyl rubber, a reinforcing filler, graphite and a plasticizing resin.

Unless expressly indicated otherwise, the percentages indicated in the present application are in wt %.

II-1. Elastomer or "Rubber"

As is customary, the terms "elastomer" and "rubber" are used interchangeably.

The composition according to the invention, intended for an impermeable tubeless tire inner liner, contains at least a butyl rubber, used by itself, or as a blend with one or more other butyl rubbers or diene elastomers.

The term "butyl rubber" is understood to mean a polyisobutylene homopolymer or a polyisobutylene/isoprene copolymer (in such a case this butyl rubber is included within the diene elastomers), and also halogenated, in particular generally brominated or chlorinated, derivatives of these polyisobutylene homopolymers and polyisobutylene/isoprene copolymers.

The following examples of butyl rubbers that are particularly suitable for implementing the invention may be mentioned: isobutylene/isoprene copolymers (IIR), bromo-butyl rubbers such as the bromoisobutylene/isoprene copolymer (BIIR), chlorobutyl rubbers such as the chloroisobutylene/isoprene copolymer (CIIR) and isobutylene rubbers.

By extension of the above definition, the term "butyl rubber" will also include copolymers of isobutylene with stirene derivatives, such as brominated isobutylene/methylstirene copolymers (BIMS), of which in particular the elastomer called EXXPRO sold by Exxon forms part.

A "diene" rubber or elastomer must be understood, as is known, to mean an elastomer (or one or more elastomers) at least partly obtained (i.e. a homopolymer or a copolymer) from diene monomers (monomers having two, conjugated or unconjugated, carbon-carbon double bonds).

These diene elastomers may be classified in two categories: "essentially unsaturated" or "essentially saturated". The term "essentially unsaturated" is understood to mean a diene elastomer resulting at least partly from conjugated diene monomers, having a number of diene units or units of diene origin (conjugated dienes) that is greater than 15% (mol %). Within the "essentially unsaturated" diene elastomer category, the term "highly unsaturated" diene elastomer is understood in particular to mean a diene elastomer having a number of units of diene origin (conjugated dienes) that is greater than 50%.

Thus, diene elastomers such as some butyl rubbers or diene/α-olefin copolymers of the EPDM type may be termed "essentially saturated" diene elastomers (small or very small number of units of diene origin, always less than 15%).

Having given these definitions, it will be understood more particularly that a diene elastomer, whichever of the above categories it belongs to, that can be used in the compositions according to the invention means:
(a) any homopolymer obtained by polymerizing a conjugated diene monomer having 4 to 12 carbon atoms;
(b) any copolymer obtained by copolymerizing one or more conjugated dienes with one another or with one or more vinylaromatic compounds having 8 to 20 carbon atoms;
(c) a ternary copolymer obtained by copolymerizing ethylene, an α-olefin having 3 to 6 carbon atoms with an unconjugated diene monomer having 6 to 12 carbon atoms, such as for example the elastomers obtained from ethylene, propylene and an unconjugated diene monomer of the aforementioned type, such as in particular 1,4-hexadiene, ethylidene norbornene and dicyclopentadiene; and
(d) a copolymer of isobutene and isoprene (butyl diene rubber), and also the halogenated, in particular chlorinated or brominated, versions of this type of copolymer.

Although the present invention applies to any type of diene elastomer, a person skilled in the art of tires will understand that it is preferably employed with essentially saturated elastomers, in particular of the type (d) above.

Suitable conjugated dienes are in particular: 1,3-butadiene, 2-methyl-1,3-butadiene, 2,3-di($C_1$-$C_5$ alkyl)-1,3-butadienes, such as for example 2,3-dimethyl-1,3-butadiene, 2,3-diethyl-1,3-butadiene, 2-methyl-3-ethyl-1,3-butadiene, 2-methyl-3-isopropyl-1,3-butadiene; a 1,3-arylbutadiene, 1,3-pentadiene; and 2,4-hexadiene. Suitable vinylaromatic compounds are, for example: stirene, ortho-, meta- and para-methylstirene, and the commercial "vinyl-toluene" mixture, para-tert-butylstirene, methoxystirenes, chlorostirenes, vinylmesitylene, divinylbenzene and vinylnaphthalene.

The copolymers may contain between 99% and 20% by weight of diene units and between 1% and 80% by weight of vinylaromatic units. The elastomers may have any microstructure, which depends on the polymerization conditions used, in particular the presence or absence of a modifying and/or randomizing agent, and on the amounts of modifying and/or randomizing agent employed. The elastomers may for example be block, random, sequence or microsequence elastomers and may be prepared in dispersion or in solution. They may be coupled and/or star-configured or else functionalized with a coupling and/or star-configuring or functionalizing agent.

Suitable polymers are polybutadienes, and in particular those having a content (mol %) of −1,2 units between 4% and 80% and those having a content (mol %) of cis-1,4 units greater than 80%, polyisoprenes, butadiene-stirene copolymers and in particular those having a stirene content between 5% and 50%, more particularly between 20% and 40%, by weight, a −1,2 bond content (mol %) of the butadiene part between 4% and 65% and a trans-1,4 bond content (mol %) between 20% and 80%; butadiene-isoprene copolymers and especially those having an isoprene content between 5% and 90% by weight and a glass transition temperature ($T_g$, measured according to the ASTM D3418) ranging from −40° C. to −80° C.; isoprene-stirene copolymers, and especially those having a stirene content between 5% and 50% by weight and a $T_g$ between −25° C. and −50° C. In the case of butadiene-stirene-isoprene copolymers, particularly suitable are those having a stirene content between 5% and 50%, more particularly between 10% and 40%, by weight, an isoprene content between 15% and 60%, and more particularly between 20% and 50%, by weight, a butadiene content between 5% and 50%, and more particularly between 20% and 40%, by weight, a content (mol %) of −1,2 units of the butadiene part between 4% and 85%, a content (mol %) of trans-1,4 units of the butadiene part between 6% and 80%, a content (mol %) of −1,2 plus −3,4 units of the isoprene part between 5% and 70% and a content (mol %) of trans-1,4 units of the isoprene part between 10% and 50% and more generally any butadiene-stirene-isoprene copolymer having a $T_g$ between −20° C. and −70° C.

Finally, the term "isoprene elastomer" is understood to mean, as is known, either an isoprene homopolymer or an isoprene copolymer, in other words a diene elastomer chosen from the group formed by natural rubber (NR), synthetic polyisoprenes (IR), various isoprene copolymers and blends of these elastomers. Among isoprene copolymers, mention may in particular be made of isobutene-isoprene (IIR) copolymers, isoprene-stirene (SIR) copolymers, isoprene-butadiene (BIR) copolymers and isoprene-butadiene-stirene (SBIR) copolymers. This isoprene elastomer is preferably natural rubber or a synthetic cis-1,4 polyisoprene. Among these synthetic polyisoprenes, it is preferred to use polyisoprenes having a content (mol %) of cis-1,4 bonds greater than 90%, more preferably still greater than 98%.

To summarize, the butyl rubber of the composition according to the invention is preferably chosen from the group of essentially saturated diene elastomers formed by isobutene/isoprene copolymers and their halogenated derivatives, this essentially saturated elastomer possibly being used as a blend with an elastomer chosen from the group of highly unsaturated diene elastomers formed by polybutadienes ("BR"), synthetic polyisoprenes (IR), natural rubber (NR), butadiene copolymers, isoprene copolymers, butadiene/stirene copolymers (SBR), isoprene/butadiene copolymers (BIR), isoprene/stirene copolymers (SIR) and isoprene/butadiene/stirene copolymers (SBIR), and blends of these elastomers.

II-2. Reinforcing Filler

Any type of reinforcing filler known for its capability of reinforcing a rubber composition that can be used for manufacturing tires may be used, for example an organic filler such as carbon black, a reinforcing inorganic filler, such as silica, or a blend of these two types of filler, especially a carbon black/silica blend.

Suitable carbon blacks are carbon blacks in particular of the HAF, ISAF and SAF types which are conventionally used in tires (tire-grade blacks). Among the latter, the following may more particularly be mentioned: reinforcing carbon blacks of the 100, 200 or 300 series (ASTM grades), such as for example the blacks N115, N134, N234, N326, N330, N339, N347 and N375, or else, depending on the intended application, blacks of higher series (for example N660, N683, N772, or even N990).

The term "reinforcing inorganic filler" should be understood in the present application to mean, by definition, any inorganic or mineral filler, whatever its colour and its origin (natural or synthetic), also called a "white" filler, a "light" filler or even a "non-black filler" as opposed to carbon black, capable of by itself reinforcing, without means other than an intermediate coupling agent, a rubber composition intended for the manufacture of tires, in other words capable of replacing, in its reinforcing function, a conventional tire-grade carbon black. Such a filler is generally characterized, as is known, by the presence of hydroxyl (—OH) groups on its surface.

The reinforcing inorganic filler may be in any physical state, i.e. in the form of powder, microspheres, granules, beads or any other appropriate densified form. Of course, it is understood that reinforcing inorganic fillers also include mixtures of various reinforcing inorganic fillers, in particular highly dispersible siliceous and/or aluminous fillers as described below.

Suitable reinforcing inorganic fillers are in particular mineral fillers of the siliceous type, particularly silica ($SiO_2$), or of the aluminous type, in particular alumina ($Al_2O_3$). The silica used may be any reinforcing silica known to those skilled in the art, especially any precipitated or pyrogenic silica having a BET specific surface area and a CTAB specific surface area that are both less than 450 $m^2/g$, preferably ranging from 30 to 400 $m^2/g$. As highly dispersible precipitated silicas ("HDS"), the following may for example be mentioned: the silicas Ultrasil 7000 and Ultrasil 7005 from Degussa; the silicas Zeosil 1165 MP, 1135 MP and 1115 MP from Rhodia, the silica EZ150G from PPG; the silicas Zeopol 8715, 8745 and 8755 from Huber; and the silicas having a high specific surface area as described in the application WO 03/16837.

Finally, a person skilled in the art will understand that, as the equivalent filler of the reinforcing inorganic filler described in the present paragraph, a reinforcing filler of another, especially organic, nature could be used provided that this reinforcing filler is covered with an inorganic layer, such as a silica layer, or else it includes functional, especially hydroxyl, sites on its surface that require the use of a coupling agent in order to establish bonding between the filler and the elastomer.

It will be recalled here that the term "coupling agent" is understood, as is known, to mean an agent capable of establishing a sufficient bond (of chemical and/or physical type), between the inorganic filler and the elastomer. Such coupling agents, especially silica/elastomer coupling agents, have been described in very many documents, the most common agents being difunctional organosilanes bearing alkoxyl functional groups (i.e., by definition, "alkoxysilanes") and functional groups capable of reacting with the elastomer—for example polysulphide functional groups.

As reinforcing filler, it is preferable to use carbon black in a proportion of greater than 30 phe. Preferably, the carbon black content is between 30 and 120 phe, since above the latter content the penalty in terms of composition stiffening is too great for an application as a tire inner liner. It is clear that carbon blacks of very high ASTM grade, such as N990 carbon black, are less reinforcing than 700 grade carbon blacks and even more so than 600 grade carbon blacks, and that it is necessary, for the same reinforcement, to use higher carbon black contents in the case of 900 grade carbon blacks than in the case of 600 or 700 grade blacks.

More preferably, the proportion of carbon black is between 30 and 70 phe. This is in particular the case when 600 or 700 grade carbon blacks are used, and even more preferably this proportion is between 35 and 60 phe.

The carbon black may advantageously constitute the sole reinforcing filler or the predominant reinforcing filler. Of course, a single carbon black or a blend of several carbon blacks of different ASTM grades may be used.

The carbon black may also be used as a blend with other reinforcing fillers, particularly reinforcing inorganic fillers such as those described above, and particularly silica.

III-3 Graphite Filler

The term "graphite" is understood in general to mean as assembly of non-compact hexagonal sheets of carbon atoms, called graphenes. Graphite, of the hexagonal crystal system, comprises a stack of the ABAB type in which the B plane is translated relative to the A plane; it belongs to the crystal group having a P63/mmc space group.

Graphite cannot be considered as a reinforcing filler within the definition specified in section III-2, however it may be considered as a semireinforcing filler insofar as it increases the tensile modulus of a rubber composition into which it is incorporated.

Having given these definitions, a graphite that can be used in the compositions according to the invention will be understood more particularly to be:

(a) any natural graphite, associated with metamorphic rocks, after separating the impurities accompanying graphite veins and after milling;

(b) any thermally expansible natural graphite, i.e. one in which a chemical compound in the liquid state, for example an acid, is interpolated between its graphene planes;

(c) any expanded natural graphite, produced in two stages: intercalation of a chemical compound in the liquid state, for example an acid, between the graphene planes of a natural graphite by a chemical treatment followed by high-temperature expansion; and (d) any synthetic graphite obtained by the graphitization of petroleum coke.

The compositions of the invention may contain a single graphite or a mixture of several graphites. Thus a blend of natural graphite and/or expanded graphite and/or synthetic graphite may be used.

The graphite as defined above may be morphologically in lamellar or non-lamellar form. Surprisingly, it has been found that graphites with either of these two types of morphology are suitable in the compositions according to the invention. However, graphites of lamellar form are preferentially suitable, the more so when they are oriented so as to have their largest face perpendicular to the gas permeation flux.

Graphite is present in the composition according to the invention in contents ranging from 3 phe to 50 phe, and preferably between 5 and 30 phe.

The graphite may be used as a blend with inert (non-reinforcing) fillers such as clay, bentonite, talc, chalk and kaolin particles.

II-4.—Hydrocarbon Plasticizing Resin

The rubber compositions of the invention use a hydrocarbon plasticizing resin having a glass transition temperature $T_g$ above 20° C. and a softening point below 170° C., as explained in detail below.

As is known to those skilled in the art, the term "plasticizing resin" is reserved in the present application, by definition, to a compound which on the one hand is solid at room temperature (23° C.) (as opposed to a liquid plasticizer such as an oil) and, on the other hand, compatible (i.e. miscible at the content used, typically greater than 5 phe) with the rubber composition for which it is intended, so as to act as a true diluent.

Hydrocarbon resins are polymers well known to those skilled in the art which are therefore, by nature, miscible in elastomer compositions, in which case they are also termed "plasticizers".

They have been widely described in the patents and patent applications mentioned in the introduction of the present document, and also for example in the work entitled "Hydrocarbon Resins" by R. Mildenberg, M. Zander and G. Collin (New York, VCH, 1997, ISBN 3-527-28617-9), Chapter 5 of which is devoted to their applications, especially in rubber tires (5.5. "Rubber Tires and Mechanical Goods").

They may be aliphatic, naphthenic or aromatic or else of the aliphatic/naphthenic/aromatic type, i.e. based on aliphatic and/or naphthenic and/or aromatic monomers. They may be natural or synthetic resins, based on petroleum (also known in such a case as petroleum resins) or not based on petroleum. Preferably, they are exclusively hydrocarbons, i.e. they contain only carbon and hydrogen atoms.

Preferably, the hydrocarbon plasticizing resin has at least one, more preferably both, of the following characteristics:
- a number-average molecular weight ($M_n$) of between 400 and 2000 g/mol;
- a polydispersity index (PI) of less than 3 (it will be recalled that PI=$M_w/M_n$ where $M_w$ is the weight-average molecular weight).

Preferably, this hydrocarbon plasticizing resin has at least one, and even more preferably all, of the following characteristics:
- a $T_g$ above 30° C.;
- a molecular weight $M_n$ of between 500 and 1500 g/mol; and
- a polydispersity index PI of less than 2.

The glass transition temperature $T_g$ is conventionally measured by DSC (differential scanning calorimetry) according to the standard ASTM D3418 (1999) and the softening point is measured according to the standard ASTM E-28.

The macrostructure ($M_w$, $M_n$ and PI) of the hydrocarbon resin is determined by SEC (steric exclusion chromatography): tetrahydrofuran solvent; 35° C. temperature; 1 g/l concentration; 1 ml/min flow rate; solution filtered on a 0.45 μm porosity filter before injection; Moore calibration with polystyrene standards; set of three WATERS columns in series (STYRAGEL HR4E, HR1 and HR0.5 columns); differential refractometer (WATERS 2410) detection and associated operating software (WATERS EMPOWER).

According to one particularly preferred embodiment, the hydrocarbon plasticizing resin is chosen from the group formed by cyclopentadiene (CPD) or dicyclopentadiene (DCPD) homopolymer or copolymer resins, terpene homopolymer or copolymer resins, $C_5$-cut homopolymer or copolymer resins and blends of these resins.

Among the above copolymer resins preferably used are those chosen from the group formed by (D)CPD/vinylaromatic copolymer resins, (D)CPD/terpene copolymer resins, (D)CPD/$C_5$-cut copolymer resins, terpene/vinylaromatic copolymer resins, $C_5$-cut/vinylaromatic copolymer resins and blends of these resins.

The term "terpene" comprises here, as is known, alpha-pinene, beta-pinene and limonene monomers. It is preferable to use a limonene monomer, a compound which, as is known, is in the form of three possible isomers: l-limonene (the laevorotary enantiomer), d-limonene (the dextrorotary enantiomer) and dipentene (the racemic mixture of the dextrorotary and laevorotary enantiomers).

Suitable vinylaromatic monomers are for example: stirene, alpha-methylstirene, ortho-, meta- and para-methylstirene, vinyltoluene, para-tert-butylstirene, methoxystirenes, chlorostirenes, vinylmesitylene, divinylbenzene, vinylnaphthalene, any vinylaromatic monomer derived from a $C_9$-cut (or more generally from a $C_8$- to $C_{10}$-cut). Preferably, the vinylaromatic compound is stirene or a vinylaromatic monomer derived from a $C_9$-cut (or more generally from a $C_8$- to $C_{10}$-cut). Preferably, the vinylaromatic compound is the minor monomer, expressed as a molar fraction, in the copolymer in question.

According to a more particularly preferred embodiment, the hydrocarbon plasticizing resin is chosen from the group formed by (D)CPD homopolymer resins, (D)CPD/stirene copolymer resins, polylimonene resins, limonene/stirene copolymer resins, limonene/D(CPD) copolymer resins, $C_5$-cut/stirene copolymer resins, $C_5$-cut/$C_9$-cut copolymer resins and blends of these resins.

The above preferred resins are well known to those skilled in the art and commercially available, for example:
- polylimonene resins, sold by DRT under the name "Dercolyte L120" ($M_n$=625 g/mol; $M_w$=1010 g/mol; PI=1.6; $T_g$=72° C.) or by ARIZONA under the name "Sylvagum TR7125C" ($M_n$=630 g/mol; $M_w$=950 g/mol; PI=1.5; $T_g$=70° C.);
- $C_5$-cut/vinylaromatic, especially $C_5$-cut/stirene, or $C_5$-cut/$C_9$-cut copolymer resins, sold by Neville Chemical Company under the names "Super Nevtac 78", "Super Nevtac 85" and "Super Nevtac 99", or by Goodyear Chemicals under the name "Wingtack Extra", or by Kolon under the names "Hikorez T1095" and "Hikorez T1100" or by Exxon under the names "Escorez 2101" and "ECR 373"; and
- limonene/stirene copolymer resins, sold by DRT under the name "Dercolyte TS 105" and by ARIZONA Chemical Company under the names "ZT115LT" and "ZT5100".

The hydrocarbon resin content is preferably between 2 and 35 phe. Below the minimum indicated, the intended technical effect may prove to be insufficient, whereas above the maximum indicated the tack of the compositions in the green state on the mixing tools may in certain cases become unacceptable from the industrial standpoint. The hydrocarbon resin content is even more preferably between 5 and 25 phe.

II-5. Various Additives

The rubber compositions according to the invention may also include some or all of the standard additives conventionally used in elastomer compositions intended for the manufacture of tires or semifinished products for tires, such as for example other plasticizers (other than the plasticizing system of the invention), preferably non-aromatic or very slightly aromatic plasticizers, for example naphthenic oils, paraffinic oils, MES or TDAE oils, glycerol esters (particularly trioleates), especially natural esters such as rapeseed or sunflower vegetable oils, pigments, protection agents such as anti-ozonants and antioxidants, anti-fatigue agents, a crosslinking system based either on sulphur or on sulphur donors and/or based on peroxides and/or bismaleimides, vulcanization accelerators, vulcanization activators and antireversion agents.

These compositions may also contain, in addition to the coupling agents, coupling activators or covering agents for the inorganic fillers or more generally processing aids that are capable, as is known, thanks to an improvement in the dispersion of the filler in the rubber matrix and to a lowering of the viscosity of the compositions, of improving their processability in the green state, these agents being for example hydrolyzable silanes, such as alkylalkoxysilanes, polyols, polyethers, primary, secondary or tertiary amines, and hydroxylated or hydrolyzable polyorganosiloxanes.

II-6. Manufacture of the Rubber Compositions

The compositions are manufactured in suitable mixers, using two successive preparation steps well known to those skilled in the art, namely a first, thermomechanical working or kneading step (called the "non-productive" step) at high temperature, up to a maximum temperature of between 110° C. and 190° C., preferably between 130° C. and 180° C., followed by a second, mechanical working step (called the "productive" step) up to a lower temperature, typically below 110° C., for example between 40° C. and 100° C., during which finishing step the crosslinking system is incorporated.

The process according to the invention for preparing a rubber composition for a tire inner liner comprises the following steps:
of incorporating into an elastomer at least one reinforcing filler, graphite and a hydrocarbon plasticizer, the $T_g$ of which is above 0° C., during a first ("non-productive") step, by thermomechanically mixing all the ingredients, one or more times, until a maximum temperature of between 110° C. and 190° C. is reached;
of cooling the mixture down to a temperature below 100° C.;
a crosslinking system of then incorporating during a second ("productive") step; and
of mixing everything until a maximum temperature below 110° C. is reached.

To give an example, the non-productive phase is carried out in a single thermomechanical step during which all the necessary basic constituents (elastomer, reinforcing filler and coupling agent if necessary, graphite and plasticizing system) are firstly introduced into a suitable mixer, such as a standard internal mixer, and then secondly, for example after one to two minutes of mixing, the other additives, optional covering agents or complementary processing aids, with the exception of the crosslinking system are introduced. After the mixture thus obtained has cooled, the crosslinking system is then incorporated in an external mixer, such as a two-roll mill, maintained at low temperature (for example between 40° C. and 100° C.). All the ingredients are then mixed (during the productive phase) for a few minutes, for example between 2 and 15 minutes.

The crosslinking system is preferably a vulcanization system based on sulphur and an accelerator. It is possible to use any compound that can act as a vulcanization accelerator for elastomers in the presence of sulphur, in particular those chosen from the group formed by 2-mercaptobenzothiazyl disulphide (abbreviated to MBTS), N-cyclohexyl-2-benzothiazyl sulphenamide (abbreviated to CBS), N,N-dicyclohexyl-2-benzothiazyl sulphenamide (abbreviated to DCBS), N-tert-butyl-2-benzothiazyl sulphenamide (abbreviated to TBBS), N-tert-butyl-2-benzothiazyl sulphenimide (abbreviated to TBSI) and mixtures of these compounds. Preferably, a primary accelerator of the sulphenamide type is used.

Various known secondary accelerators or vulcanization activators, such as zinc oxide, stearic acid, guanidine derivatives (in particular diphenylguanidine), etc., may be added to this vulcanization step during the first, non-productive step and/or during the productive step.

The final composition thus obtained is then calendered, for example in the form of a sheet, especially for laboratory characterization, or else extruded in the form of a rubber strip that can be used as a tire inner liner.

The vulcanization (or curing) is carried out, in a known manner, generally at a temperature of between 130° C. and 200° C. for a sufficient time, which may vary for example between 5 and 90 minutes, depending in particular on the curing temperature, the vulcanization system adopted and the rate of vulcanization of the composition in question.

The invention relates to the rubber compositions described above both in what is called the "green" state (i.e. before curing) and in what is called the "cured" or vulcanized state (i.e. after vulcanization).

III—EXAMPLES OF THE IMPLEMENTATION OF THE INVENTION

The following examples serve to illustrate the invention, the latter however not being limited to just these examples.

Preparation of the Rubber Compositions

The procedure for the trials was the following: the reinforcing filler, the graphite, the plasticizer system, the butyl rubber and the various other optional ingredients, with the exception of the vulcanization system, were introduced in succession into an internal mixer, filled to 70%, the initial barrel temperature of which was about 60° C. The mixture was then thermomechanically worked (non-productive phase) in one step which lasted in total about 3 to 4 minutes, until a maximum "drop" temperature of 150° C. was reached.

The mixture thus obtained was recovered, cooled and then sulphur and a sulphenamide-type accelerator incorporated thereinto on an external mixer (homo-finisher) at 30° C., all the ingredients being mixed (productive phase) for a suitable time (for example between 5 and 12 minutes).

The compositions thus obtained were then calendered either in the form of rubber sheets (2 to 3 mm thickness) or thin rubber sheets in order to measure their physical and mechanical properties, or were extruded in the form of tire inner liners.

Example 1

The purpose of this trial was to demonstrate the improvement in performance of a composition according to the invention compared with two control compositions of the prior art not only in terms of rubber properties but also of rolling properties in tires.

Rubber Tests

Three compositions A, B and C were prepared in accordance with the process described in detail in the previous paragraph and had the following same base formulation, in which the quantities are expressed in phe, i.e. parts by weight per hundred weights of elastomer:

| | |
|---|---|
| Butyl elastomer (1) | 100 |
| Carbon black (N772) | 50 |
| Zinc oxide | 1.5 |
| Stearic acid | 1.5 |
| Sulphenamide | 1.2 |
| Sulphur | 1.5 |

(1) A brominated polyisobutylene "BROMOBUTYL 2222" sold by Exxon Chemical Co.

Compositions A, B and C were defined as follows:
control composition A was a "conventional" tire inner liner composition that included no graphite;

control composition B corresponded to the prior art of patent application WO 2006/047509, which contained organophilic smectites and a hydrocarbon plasticizing resin of $T_g$ in accordance with the features of said patent application; and composition C according to the present invention contained graphite and a hydrocarbon plasticizing resin with contents in accordance with the invention.

The differences in formulation are given in Table 1 below:

TABLE 1

| Composition | A | B | C |
|---|---|---|---|
| Organophilic smectite (2) | — | 14.3 | — |
| Graphite (3) | — | — | 10 |
| Plasticizing resin (4) | — | 10 | 10 |

(2) A "methyl tallow bis-2-hydroxyethyl quaternary ammonium"-functionalized montmorillonite: "CLOISITE 30B" sold by Southern Clay (14.3 phe corresponding to 10 phe of montmorillonite and 4.3 phe of surfactants);
(3) Natural graphite: "TIMREX 80*150" sold by Timcal;
(4) Polylimonene resin: "SYLVARES 7125" ($T_g$ = 70° C.; softening point = 120° C.) sold by Arizona Chemical Company.

The rubber properties of these three compositions were measured before and after curing at 150° C. for 60 minutes. The results obtained are given in Table 2.

TABLE 2

| Composition | A | B | C |
|---|---|---|---|
| Properties before curing | | | |
| Mooney Rheometry | 65 | 56 | 52 |
| $T_i$ (min) | 2.06 | 6.23 | 2.97 |
| K (min$^{-1}$) | 0.147 | 0.096 | 0.206 |
| Properties after curing | | | |
| MA10 (MPa) | 2.7 | 3.5 | 3.0 |
| MA100 (MPa) | 1.04 | 1.20 | 1.04 |
| Stress at break (MPa) | 11.5 | 12.6 | 9.7 |
| Elongation at break (%) | 712 | 706 | 754 |
| Oxygen permeability | 100 | 79 | 71 |

This table shows that composition C according to the invention, comprising graphite and a hydrocarbon plasticizing resin has, in the green state, much better processability (lower Mooney) than control compositions A and B, even though composition B already had better processability than control composition A, and rheometric properties that are very markedly improved over composition B (the rheometry results of which are somewhat low) and slightly improved over composition A.

After curing, it may be seen that the moduli and elongation and stress at break properties of composition C according to the invention are generally equivalent to those of control composition A (composition B generally being inferior to composition A as regards these properties). In addition, composition C according to the invention has a very much lower permeability than control composition A, but also lower than that of composition B which includes an organophilic smectite and an associated hydrocarbon plasticizing resin specifically for improving the impermeability.

Thus, composition C according to the invention, which includes graphite and a hydrocarbon plasticizing resin, has improved sealing properties compared with the already very effective composition (composition B) in this regard compared with the conventional control composition (A) while succeeding in maintaining as good a level of stiffness, and therefore processability and energy at break, properties as the conventional control composition (A), at a level above that of composition B (the sealing of which is improved compared with the conventional composition A).

Tire Rolling Tests

The above compositions A, B and C were tested as inner liners for radial-carcass automobile tires of 195/65 R15 size (speed index H). There were prepared as explained in section III-1 and calendered in the form of tire inner liners with various thicknesses so as to have the same sealing (i.e. based on the sealing of control composition A) so as to be able to compare them in their performance in tires.

It will be readily understood in view of the results shown in Table 2 that the inner liner corresponding to "conventional" composition A has a thickness greater than that used for composition B according to the prior art and greater than that used for composition C according to the invention.

The thicknesses of the inner liners and the results of the measurements carried out relating to rolling resistance are given in Table 3.

TABLE 3

| Inner liner composition | A | B | C |
|---|---|---|---|
| Inner liner thickness (mm) | 0.97 | 0.49 | 0.47 |
| Rolling resistance | 100 | 109 | 115 |

These results show that for the same sealing, the tire having composition C according to the invention, which includes graphite and a hydrocarbon plasticizing resin, as inner liner exhibits better rolling resistance than the other two tires corresponding to control compositions A and B. Even though it is clear to a person skilled in the art that the reduction in thickness of the inner liner, and therefore in its weight, is an aspect going in the right direction for obtaining a reduction in rolling resistance, this effective result of lowering the rolling resistance cannot nevertheless be ascribed just to this change in the tire. It is therefore both the novel composition of inner liner C itself and its sealing properties, enabling the weight of the inner liner in the tire to be reduced, which makes it possible to achieve this improved tire rolling resistance.

The charge/speed endurance test and the low-pressure test for the three tires, the inner liner of which is made of compositions A, B and C respectively, proved to be positive, i.e., on the one hand, the three tires are capable of achieving the maximum intended speed for this type of tire following the statutory stages and meet, at low pressure, the requirements as regards their being no visual damage and the requirement of pressure retention. It should be noted that this validation of the endurance requirements is all the more remarkable in the case of the tire having an inner liner of composition C according to the invention for which the thickness of the inner liner is very much smaller than that of the control tire, the inner liner of which comprises the "conventional" composition A and which nevertheless is not penalized by this small thickness.

The improvement in the overall compromise of properties: sealing/rolling resistance, obtained for a tire whose inner liner made of composition C according to the invention is both very remarkable and surprising.

Example 2

The purpose of this example is to show the improvement in rubber properties of a composition C according to the invention which is identical to that of Example 1 compared with a composition D corresponding to a "conventional" base composition according to the base formulation of all the compositions of Example 1, but in which graphite has been added.

The two compositions C and D were therefore prepared in accordance with the process described above, and are distinguished as follows:

composition C according to the invention contained graphite and a hydrocarbon plasticizing resin in contents according to the invention, control composition D contained graphite in the same proportion as composition C, but no resin.

The differences in formulation of these two compositions are given in Table 4 below:

TABLE 4

| Composition | C | D |
|---|---|---|
| Graphite (3) | 10 | 10 |
| Plasticizing resin (4) | 10 | — |

(3) Natural graphite: "TIMREX 80*150" sold by Timcal;
(4) Polylimonene resin: "SYLVARES 7125" ($T_g$ = 70° C.; softening point = 120° C.) sold by Arizona Chemical Company.

The rubber properties of these two compositions were measured before and after curing at 150° C. for 60 minutes. The results are given in Table 5.

TABLE 5

| Composition | C | D |
|---|---|---|
| Properties before curing | | |
| Mooney Rheometry | 52 | 62 |
| $T_i$ (min) | 2.97 | 2.82 |
| K (min$^{-1}$) | 0.206 | 0.144 |
| Properties after curing | | |
| MA10 (MPa) | 3.0 | 4.0 |
| MA100 (MPa) | 1.04 | 1.46 |
| Stress at break (MPa) | 9.7 | 9.0 |
| Elongation at break (%) | 754 | 607 |
| Oxygen permeability | 71 | 77 |

This table shows that the processability of composition D, which did not include a hydrocarbon plasticizer resin, is inferior (higher Mooney) than composition C according to the invention, this being an expected result insofar as the resins are known for improving the processability of the mixtures.

Likewise, the properties after curing reveal the effect of the lack of resin in composition D: greater stiffness reflected in the MA values in the case of composition D than in the case of composition C according to the invention and inferior elongation at break of composition D compared with composition C.

However, quite unexpectedly, it may be seen that composition D containing only graphite has a lower impermeability than composition C according to the invention, which contains graphite and a plasticizing resin.

Now, it is known that resins generally impair the impermeability. Even though the detrimental effect is less thanks to the use of a resin having a high glass transition temperature, as is the case for C, it might be expected at best to obtain, with composition C according to the invention, a permeability identical to that of composition D. The improvement in impermeability in the case of composition C clearly stems from a surprising combination effect between graphite and resin.

It is therefore clearly apparent that the composition according to the invention makes it possible to obtain improved properties (processability, energy at break, permeability) not only relative to a "conventional" control composition (Example 1) but also compared with a composition that also includes, in addition to the reinforcing filler, graphite.

Example 3

The purpose of this example is to show the improvement in rubber properties of two compositions according to the invention, namely C and E, C being identical to Example 1, which include hydrocarbon plasticizing resins of different $T_g$, compared with "conventional" control composition A of Example 1.

Composition E corresponds to a base formulation identical to that of Example 1 and has therefore been prepared in accordance with the process described above. Compositions C and E according to the invention differ from each other as follows:

composition C according to the invention comprises graphite and a polylimonene resin of 70° C. $T_g$ in contents according to the invention; and composition E according to the invention comprises graphite and a hydrocarbon (pure C5) plasticizing resin of 49° C. $T_g$ in contents according to the invention.

The differences in formulation of these three compositions are given in Table 6 below:

TABLE 6

| Composition | A | C | E |
|---|---|---|---|
| Graphite (3) | — | 10 | 10 |
| Plasticizing resin (4) | — | 10 | — |
| Plasticizing resin (5) | — | — | 10 |

(4) polylimonene resin: "SYLVARES 7125" ($T_g$ = 70° C.; softening point = 120° C.) sold by Arizona Chemical Company;
(5) aliphatic (pure C5) resin: "Hikorez A-1100", ($T_g$ = 49° C.; softening point 99° C.), sold by Kolon.

The rubber properties of these compositions were measured before and after curing at 150° C. for 60 minutes. The results are given in Table 7 below.

TABLE 7

| Composition | A | C | E |
|---|---|---|---|
| Properties before curing | | | |
| Mooney Rheometry | 65 | 52 | 53 |
| $T_i$ (min) | 2.06 | 2.97 | 2.72 |
| K (min$^{-1}$) | 0.147 | 0.206 | 0.216 |
| Properties after curing | | | |
| MA10 (MPa) | 2.7 | 3.0 | 3.4 |
| MA100 (MPa) | 1.04 | 1.04 | 1.13 |
| Stress at break (MPa) | 11.5 | 9.7 | 9.3 |
| Elongation at break (%) | 712 | 754 | 710 |
| Oxygen permeability | 100 | 71 | 74 |

The same observations as the comparison in Example 1 between control composition A and composition C according to the invention may in general be made, i.e. the results here show that, in the case of composition E according to the invention, but containing a 49° C. $T_g$ hydrocarbon plasticizing resin:

improved properties before curing in the case of processability (Mooney) and improved or generally equivalent properties in the case of rheometry compared with control composition A;

properties after curing (deformation and behaviour at break) which are generally equivalent to that of control composition A; and markedly improved sealing compared with control composition A.

It should be noted that the gain in sealing obtained with composition E, which includes the resin having a 49° C. $T_g$, is also significant if the gain is compared with composition D of Example 2 in which there is no plasticizing resin.

The invention claimed is:

1. A tire inner liner having a rubber composition based on at least one butyl rubber, a reinforcing filler and a plasticizing system, wherein the composition includes graphite and the plasticizing system comprises a hydrocarbon plasticizing resin, the glass transition temperature $T_g$ of which is above 20° C. and the softening point of which is below 170° C.

2. The inner liner according to claim 1, wherein the elastomeric matrix of the rubber composition comprises predominantly one butyl rubber or predominantly one blend of several butyl rubbers.

3. The inner liner according to claim 2, wherein the elastomeric matrix of the rubber composition comprises only a butyl rubber or a blend of several butyl rubbers.

4. The inner liner according to claim 2, wherein the elastomeric matrix of the rubber composition comprises one or more other diene elastomers.

5. The inner liner according to claim 4, wherein the elastomeric matrix of the rubber composition comprises one or more other essentially unsaturated diene elastomers.

6. The inner liner according to claim 1, wherein the butyl rubber is an isobutene/isoprene copolymer.

7. The inner liner according to claim 1, wherein the butyl rubber is a brominated polyisobutylene.

8. The inner liner according to claim 1, wherein the butyl rubber is a chlorinated polysisobutylene.

9. The inner liner according to claim 4, wherein the butyl rubber is blended with an isoprene polymer.

10. The inner liner according to claim 1, wherein the reinforcing filler comprises carbon black.

11. The inner liner according to claim 10, wherein the carbon black content is greater than 30 phe.

12. The inner liner according to claim 10, wherein the carbon black content is between 30 and 120 phe.

13. The inner liner according to claim 10, wherein the carbon black content is between 30 and 70 phe.

14. The inner liner according to claim 10, wherein the carbon black content is between 35 and 60 phe.

15. The inner liner according to claim 1, wherein the reinforcing filler comprises a reinforcing inorganic filler.

16. The inner liner according to claim 15, wherein the reinforcing inorganic reinforcing filler is silica.

17. The inner liner according to claim 1, wherein the hydrocarbon plasticizing resin has a $T_g$ of above +30° C.

18. The inner liner according to claim 1, wherein the hydrocarbon plasticizing resin content is between 2 and 35 phe.

19. The inner liner according to claim 18, wherein the hydrocarbon plasticizing resin content is between 5 and 25 phe.

20. The inner liner according to claim 1, wherein the hydrocarbon plasticizing resin is chosen from the group formed by cyclopentadiene (CPD) or dicyclopentadiene (DCPD) homopolymer or copolymer resins, terpene homopolymer or copolymer resins, $C_5$-cut homopolymer or copolymer resins and blends of these resins.

21. The inner liner according to claim 20, wherein the copolymer resins are chosen from the group formed by (D)CPD/vinylaromatic copolymer resins, (D)CPD/terpene copolymer resins, (D)CPD/$C_5$-cut copolymer resins, terpene/vinylaromatic copolymer resins, $C_5$-cut/vinylaromatic copolymer resins and blends of these resins.

22. The inner liner according to claim 1, wherein the hydrocarbon plasticizing resin is chosen from the group formed by (D)CPD homopolymer resins, (D)CPD/stirene copolymer resins, polylimonene resins, limonene/stirene copolymer resins, limonene/D(CPD) copolymer resins, $C_5$-cut/stirene copolymer resins, $C_5$-cut/$C_9$-cut copolymer resins and blends of these resins.

23. The inner liner according to claim 22, wherein the hydrocarbon resin is a polylimonene resin.

24. The inner liner according to claim 22, wherein the hydrocarbon resin is a $C_5$-cut/stirene copolymer resin.

25. The inner liner according to claim 22, wherein the hydrocarbon resin is a $C_5$-cut/$C_9$-cut copolymer resin.

26. The inner liner according to claim 1, wherein the graphite is in a lamellar form.

27. The inner liner according to claim 1, wherein the graphite is a natural graphite.

28. The inner liner according to claim 1, wherein the graphite is an expanded graphite.

29. The inner liner according to claim 1, wherein the graphite is a synthetic graphite.

30. The inner liner according to claim 1, wherein the graphite comprises a natural graphite blend and/or an expanded graphite blend and/or a synthetic graphite blend.

31. The inner liner according to claim 1, wherein the graphite liner is between 3 and 50 phe.

32. The inner liner as claimed in claim 31, wherein the graphite content is between 5 and 30 phe.

33. The inner liner according to claim 1, wherein the composition contains a blend of several graphites.

34. The inner liner according to claim 1, wherein the composition contains one or more inert fillers.

35. A tire that includes an inner liner according to claim 1.

36. A process for producing a composition for a tire inner liner based on at least one butyl rubber, a reinforcing filler and a plasticizing system, wherein the composition also includes graphite and wherein the plasticizing system comprises a hydrocarbon plasticizing resin, the glass transition temperature $T_g$ of which is above 20° C. and the softening point of which is below 170° C., said process comprising the steps of:

incorporating into a diene elastomer, in a mixer; a reinforcing filler, graphite, and a plasticizing system, by thermo-mechanically mixing all the ingredients, one or more times, until a maximum temperature between 110° C. and 190° C. is reached;

cooling the mixture down to a temperature below 100° C.;

then incorporating a crosslinking system; and mixing everything until a maximum temperature below 110° C. is reached.

* * * * *